US010869325B2

(12) United States Patent
Jiang et al.

(10) Patent No.: US 10,869,325 B2
(45) Date of Patent: Dec. 15, 2020

(54) DYNAMIC HYBRID AUTOMATIC REPEAT REQUEST TIMING MANAGEMENT

(71) Applicant: QUALCOMM Incorporated, San Diego, CA (US)

(72) Inventors: Jing Jiang, San Diego, CA (US); Wanshi Chen, San Diego, CA (US); Naga Bhushan, San Diego, CA (US); Tingfang Ji, San Diego, CA (US); Peter Gaal, San Diego, CA (US); Joseph Binamira Soriaga, San Diego, CA (US); Li Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 15/611,493

(22) Filed: Jun. 1, 2017

(65) Prior Publication Data
US 2018/0103485 A1  Apr. 12, 2018

Related U.S. Application Data

(60) Provisional application No. 62/405,741, filed on Oct. 7, 2016.

(51) Int. Cl.
H04W 72/12 (2009.01)
H04L 1/18 (2006.01)
H04L 1/00 (2006.01)
H04L 5/00 (2006.01)
H04W 8/22 (2009.01)
(Continued)

(52) U.S. Cl.
CPC ....... *H04W 72/1268* (2013.01); *H04L 1/0003* (2013.01); *H04L 1/0009* (2013.01);
(Continued)

(58) Field of Classification Search
CPC .............. H04W 72/1268; H04W 8/22; H04W 72/1289; H04W 72/0446; H04W 52/146;
(Continued)

(56) References Cited

U.S. PATENT DOCUMENTS

2012/0140695 A1* 6/2012 Hunzinger ............ H04L 1/1812
370/315
2015/0215079 A1* 7/2015 Park ...................... H04L 5/0055
370/280
(Continued)

FOREIGN PATENT DOCUMENTS

WO  WO-2016160330 A1  10/2016

OTHER PUBLICATIONS

Huawei H., et al., "Discussion on Timing Relations for NR", 3GPP Draft; R1-1608839, 3GPP, Mobile Competence Centre; 650, Route Des Lucioles; F-06921 Sophia-Antipolis Cedex. France, vol. RAN WG1, No. Lisbon, Portugal; Oct. 10, 2016 (Year: 2016).*
(Continued)

Primary Examiner — Lan-Huong Truong
(74) Attorney, Agent, or Firm — Loza & Loza, LLP

(57) ABSTRACT

A user equipment (UE) may be categorized into one or more capability categories based on its ability to generate hybrid automatic repeat request (HARQ) responses within a predetermined delay or slot. HARQ timing management may consider a UE capability category that is UE dependent. The UE may provide a HARQ response different (i.e., advancing or delaying HARQ timing) than the specified or default HARQ response timing of the UE's category with some limitations and constraints. A constraint is a condition in which one or more operation parameters of the UE do not satisfy or meet a predetermined level or setting.

24 Claims, 13 Drawing Sheets

(51) Int. Cl.
*H04W 72/04* (2009.01)
*H04L 5/14* (2006.01)
*H04W 52/14* (2009.01)
*H04W 52/32* (2009.01)

(52) U.S. Cl.
CPC .......... *H04L 1/1854* (2013.01); *H04L 1/1861* (2013.01); *H04L 5/0055* (2013.01); *H04W 8/22* (2013.01); *H04W 72/0446* (2013.01); *H04W 72/1289* (2013.01); *H04L 1/1835* (2013.01); *H04L 1/1864* (2013.01); *H04L 5/0078* (2013.01); *H04L 5/14* (2013.01); *H04W 52/146* (2013.01); *H04W 52/325* (2013.01)

(58) Field of Classification Search
CPC .. H04W 52/325; H04L 1/0003; H04L 1/1854; H04L 1/0009; H04L 1/1861; H04L 5/0055; H04L 5/14; H04L 5/0078; H04L 1/1864; H04L 1/1835
See application file for complete search history.

(56) References Cited

U.S. PATENT DOCUMENTS

2015/0249980 A1* 9/2015 You ....................... H04L 1/1861
370/329
2016/0182213 A1* 6/2016 Golitschek Edler von Elbwart ................ H04L 1/1854
370/294
2017/0215188 A1* 7/2017 Kim .......................... H04L 1/18

OTHER PUBLICATIONS

Huawei H., et al., "Discussion on Timing Relations for NR", 3GPP Draft; R1-1608839, 3GPP, Mobile Competence Centre; 650, Route Des Lucioles; F-06921 Sophia-Antipolis Cedex. France, vol. RAN WG1, No. Lisbon, Portugal; Oct. 10, 2016-Oct. 14, 2016, (Oct. 1, 2016), XP051159166, 5 Pages (Year: 2016).*

Huawei H., et al., "Discussion on Timing Relations for NR", 3GPP Draft; R1-1608839, 3rd Generation Partnership Project (3GPP), Mobile Competence Centre; 650, Route Des Lucioles; F-06921 Sophia-Antipolis Cedex . France, vol. RAN WG1, No. Lisbon, Portugal; Oct. 10, 2016-Oct. 14, 2016, Oct. 1, 2016 (Oct. 1, 2016), XP051159166, 5 Pages, Retrieved from the Internet: URL:http://www.3gpp.org/ftp/tsg_ran/WG1_RL_1/TSGR1_86b/Docs/ [retrieved on Oct. 1, 2016].

International Search Report and Written Opinion—PCT/US2017/054490—ISA/EPO—dated Dec. 19, 2017.

* cited by examiner

|  | Same Slot | Next Slot | 2 Slots After | 3 Slots After |
|---|---|---|---|---|
| UE1 | Supported | Supported | N/A | N/A |
| UE2 | Supported w/ Limitations | Supported | Supported | N/A |
| UE3 | N/A | Supported w/ Limitations | Supported | Supported |

FIG. 6

DYNAMIC HYBRID AUTOMATIC REPEAT REQUEST TIMING MANAGEMENT

PRIORITY CLAIM

This application claims priority to and the benefit of provisional patent application No. 62/405,741 filed in the United States Patent and Trademark Office on 7 Oct. 2016, the entire content of which is incorporated herein by reference as if fully set forth below in its entirety and for all applicable purposes.

TECHNICAL FIELD

The technology discussed below relates generally to wireless communication systems, and more particularly, to hybrid automatic repeat request (HARQ) timing management in wireless communication.

INTRODUCTION

Hybrid automatic repeat request (HARQ) is a technique commonly implemented in wireless communication networks to correct error packets in the physical layer (PHY). In general, a receiving device checks the received packet transmissions for accuracy, and if no error is detected, an acknowledgment (ACK) may be transmitted; otherwise, if error is detected, a negative acknowledgment (NACK) may be transmitted. In response to a NACK, a transmitting device may perform a HARQ retransmission of the packets, which may facilitate various retransmission and decoding techniques such as chase combining, incremental redundancy, etc.

In current 3G and/or 4G networks, for example Long-Term Evolution (LTE) networks, HARQ timing is typically static, predefined, or not easily dynamically configurable. For example, a frequency division duplex (FDD) LTE network may implement a 4 millisecond (ms) fixed delay from data transmission of a physical downlink shared channel (PDSCH) to the corresponding HARQ response or feedback. In a time division duplex (TDD), HARQ timing may depend on a downlink/uplink subframe structure and timing. For example, a PDSCH transmission (downlink) may have a corresponding predetermined uplink subframe for its HARQ response after a predetermined delay. In either FDD or TDD example, the HARQ response timing is generally fixed and not dynamic.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

A user equipment (UE) may be categorized into one or more capability categories based on its ability to generate hybrid automatic repeat request (HARQ) responses within a predetermined delay or slot. HARQ timing management may consider a UE capability category that is UE dependent. The UE may provide a HARQ response different (i.e., advancing or delaying HARQ timing) than the specified or default HARQ response timing of the UE's category with some limitations and constraints. A constraint is a condition in which one or more operation parameters of the UE do not satisfy or meet a predetermined level or setting.

An aspect of the present disclosure relates to a method of performing a hybrid automatic repeat request (HARQ) process at a scheduling entity. The scheduling entity transmits data via a downlink (DL) channel in a first slot to a user equipment (UE). The scheduling entity further manages a HARQ timing of the data based on a capability category of the UE and a semi-static configuration. The scheduling entity further receives, in the first slot or a second slot after the first slot, a HARQ response including an acknowledgment (ACK) or negative acknowledgment (NACK) of the data, from the UE based on the HARQ timing.

Another aspect of the present disclosure relates to a method of performing a HARQ process at a UE. The UE receives data via a DL channel in a first slot from a network node. The UE further manages a HARQ timing of the data based on a capability category of the UE and a semi-static configuration. The UE further transmits, in the first slot or a second slot after the first slot, a HARQ response including an ACK or NACK of the data, to the network node based on the HARQ timing.

Another aspect of the present disclosure relates to an apparatus configured to communicate with a UE using HARQ. The apparatus includes a communication interface configured to communicate with the UE using a HARQ process. The apparatus further includes a memory and a processor operatively coupled to the communication interface and the memory. The processor and the memory are configured to transmit data via a DL channel in a first slot to the UE. The processor and the memory are further configured to manage a HARQ timing of the data based on a capability category of the UE and a semi-static configuration. The processor and the memory are further configured to receive, in the first slot or a second slot after the first slot, a HARQ response including an ACK or NACK of the data, from the UE based on the HARQ timing.

Another aspect of the present disclosure relates to an apparatus configured to communicate with a network node using HARQ. The apparatus includes a communication interface configured to communicate with the network node using a HARQ process. The apparatus further includes a memory and a processor operatively coupled to the communication interface and the memory. The processor and the memory are configured to receive data via a DL channel in a first slot from the network node. The processor and the memory are further configured to manage a HARQ timing of the data based on a capability category of the UE and a semi-static configuration. The processor and the memory are further configured to transmit, in the first slot or a second slot after the first slot, a HARQ response including an ACK or NACK of the data, to the network node based on the HARQ timing.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 6 is a diagram illustrating different HARQ response capability categories according to some aspects of the disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Next generation networks, for example 5G New Radio (NR), may support many categories of devices and types of services such as Enhanced Mobile Broadband (eMBB), Ultra-Reliable and Low Latency Communications (URLLC), Massive Machine Type Communications (mMTC), etc. Generally, eMBB refers to the improvements to existing broadband wireless communication technologies such as LTE or other legacy technology. For example, eMBB can provide for increased data rates and network capacity. In URLLC, reliability refers to the probability of success of transmitting a given number of data bytes within a period or slot (e.g., 1 ms) under a given channel quality. Ultra-reliable refers to a high target reliability, e.g., a packet success rate greater than 99.999%. Latency refers to the time it takes to successfully deliver an application layer packet or message. Low-latency refers to a low target communication latency, e.g., 1 ms or even 0.5 ms (in some examples, a target for eMBB may be 4 ms).

Therefore, different categories of communication devices or services may have different hybrid automatic repeat request (HARQ) response capabilities to meet different reliability and/or latency requirements. Aspects of the present disclosure provide various apparatuses and processes for dynamically or semi-statically managing HARQ response timing and resources in a wireless network while taking into account device capability, network configuration, and service types. For example, the HARQ response timing and allocated resources (e.g., time and frequency resources) of a device may be changed, reconfigured, or updated per slot. The processes may be implemented at any of the base stations, UEs, and devices described throughout this disclosure, for example, in relation to FIGS. 1-4.

Figure 1:
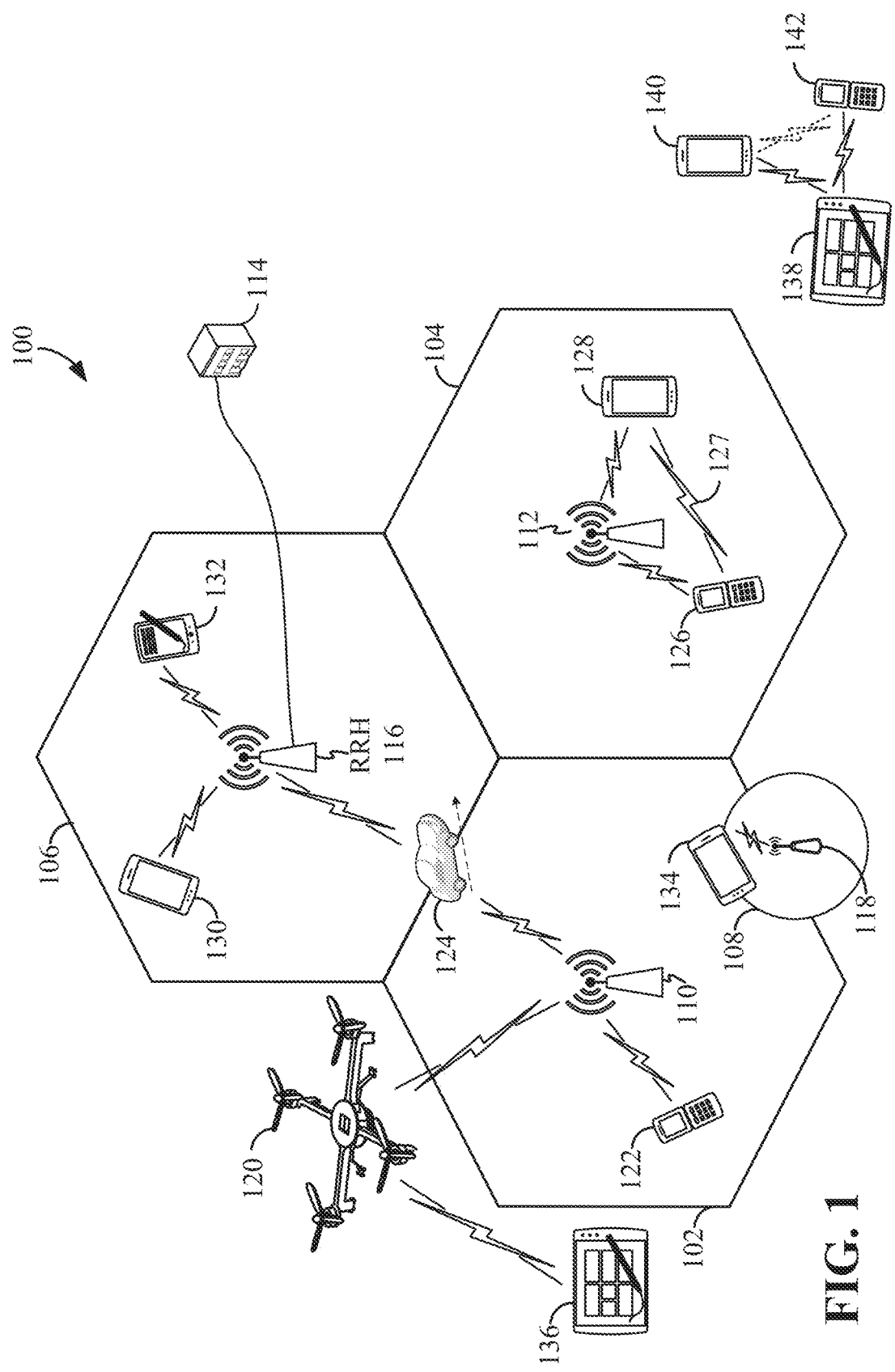
FIG. 1 is a conceptual diagram illustrating an example of a radio access network according to some aspects of the disclosure.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), gNB, new radio (NR), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an OFDM waveform, carries one resource element (RE) per subcarrier. In some examples, a slot may carry 7 or 14 OFDM symbols. A slot may refer to a duration of 1 ms or any desired time duration. Multiple slots may be grouped together to form a single frame or radio frame. Of course, these definitions are not required, and any suitable scheme for organizing waveforms may be utilized, and various time divisions of the waveform may have any suitable duration.

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates uplink and downlink resources for communication among some or all devices and equipment within its service area or cell. Within the present disclosure, as discussed further below, the scheduling entity may be responsible for scheduling, assigning, reconfiguring, and releasing uplink and downlink resources for one or more scheduled entities.

That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
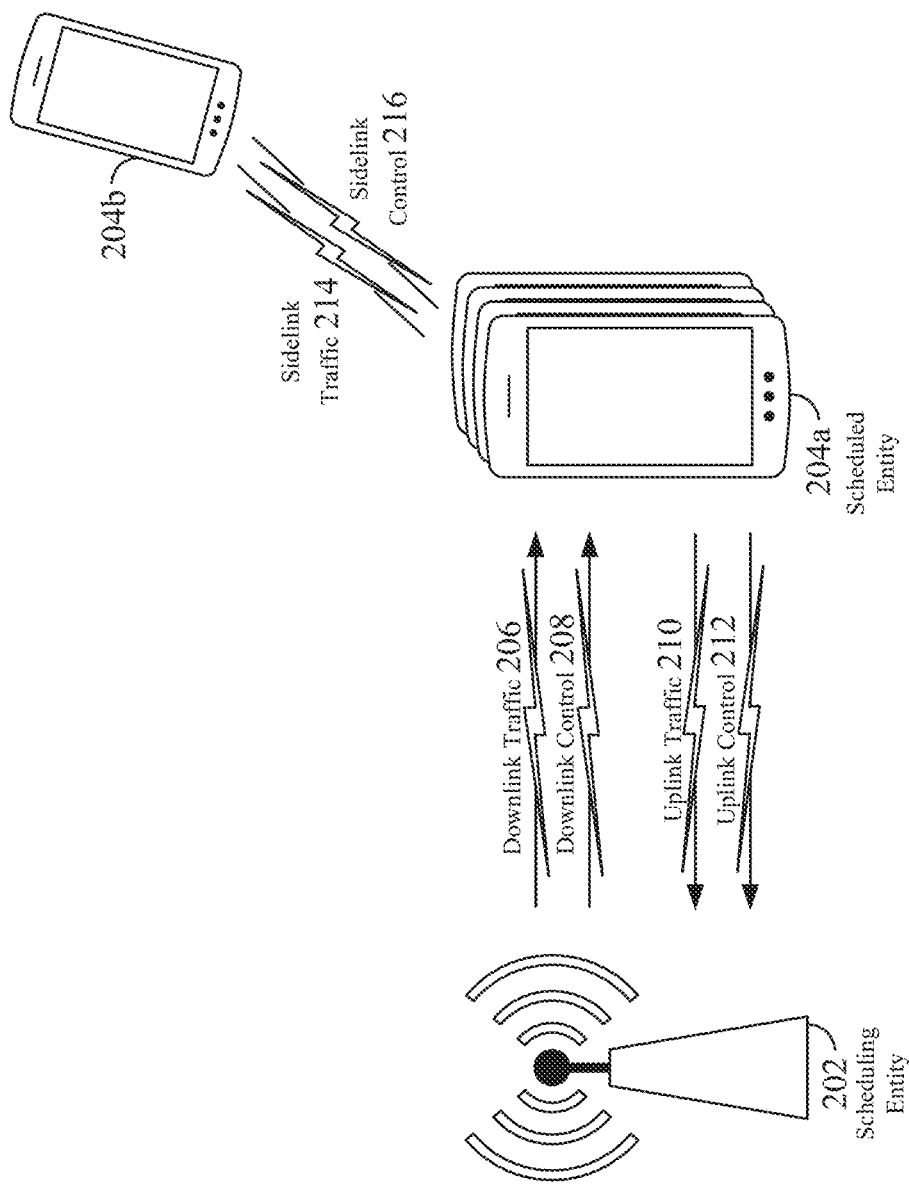
FIG. 2 is a block diagram conceptually illustrating an example of a scheduling entity communicating with one or more scheduled entities according to some aspects of the disclosure.

Thus, in a wireless communication network with scheduled access to time—frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204*a* and 204*b*). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK) for uplink data transfers. HARQ is a technique well-known to those of ordinary skill in the art, wherein packet transmissions may be checked at the receiving side for accuracy, and if confirmed, an ACK may be transmitted, whereas if not confirmed, a NACK may be transmitted. In an LTE example, PHICH is used to indicate the reception of a physical uplink shared channel (PUSCH) transmission from a UE. The PHICH indicates either an ACK or NACK, which the UE will decode to determine whether it has to retransmit or not. In response to a NACK, the transmitting device may send a HARQ retransmission, which may be used to implement chase combining, incremental redundancy, etc., and/or other techniques to decode the retransmitted data. With chase combining, every retransmission contains the same information (e.g., data and parity bits), and the receiver may use maximum-ratio combining to combine the received bits with the same bits from previous transmissions. With incremental redundancy, every retransmission includes information different from the previous one. The retransmission may use a different set of coded bits than the previous transmission. The different sets of coded bits each represent the same set of information bits. Thus, the receiver can obtain extra information at every retransmission.

Therefore, using HARQ, if the received data has error, the receiver can buffer the data and request a re-transmission from the sender by sending a NACK. When the receiver receives the re-transmitted data, it then combines it with buffered data prior to channel decoding and error detection. The receiver may use one or more soft buffers to buffer the received encoded data in which the receiver has detected an error, so that data combining can be performed to improve decoding efficiency. The receiver may maintain multiple soft buffers to support multiple HARQ processes simultaneously.

Uplink traffic 210 and/or downlink traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and traffic information may be organized by subdividing a carrier, in time, into suitable transmission time intervals (TTIs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the TTI for uplink packet transmissions.

The uplink control information 212 may also include a physical uplink control channel (PUCCH) to carry uplink control information (UCI). The UCI may include HARQ ACK/NACK for received DL data, channel quality indicator (CQI), and scheduling requests for uplink transmission. Therefore, PUCCH may be used to carry HARQ ACK/NACK in the uplink (UL) direction for the received DL data. The PUSCH may also be used to carry HARQ ACK/NACK for DL data.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may include a request-to-send (RTS) channel and a clear-to-send (CTS) channel. The RTS may provide for a scheduled entity 204 to request a duration of time to keep a sidelink channel available for a sidelink signal; and the CTS may provide for the scheduled entity 204 to indicate the availability of the sidelink channel, e.g., for a requested duration of time. An exchange of RTS and CTS signals (e.g., handshake) may enable different scheduled entities performing sidelink communications to negotiate the availability of the sidelink channel prior to communication of the sidelink traffic information 214.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Figure 3:
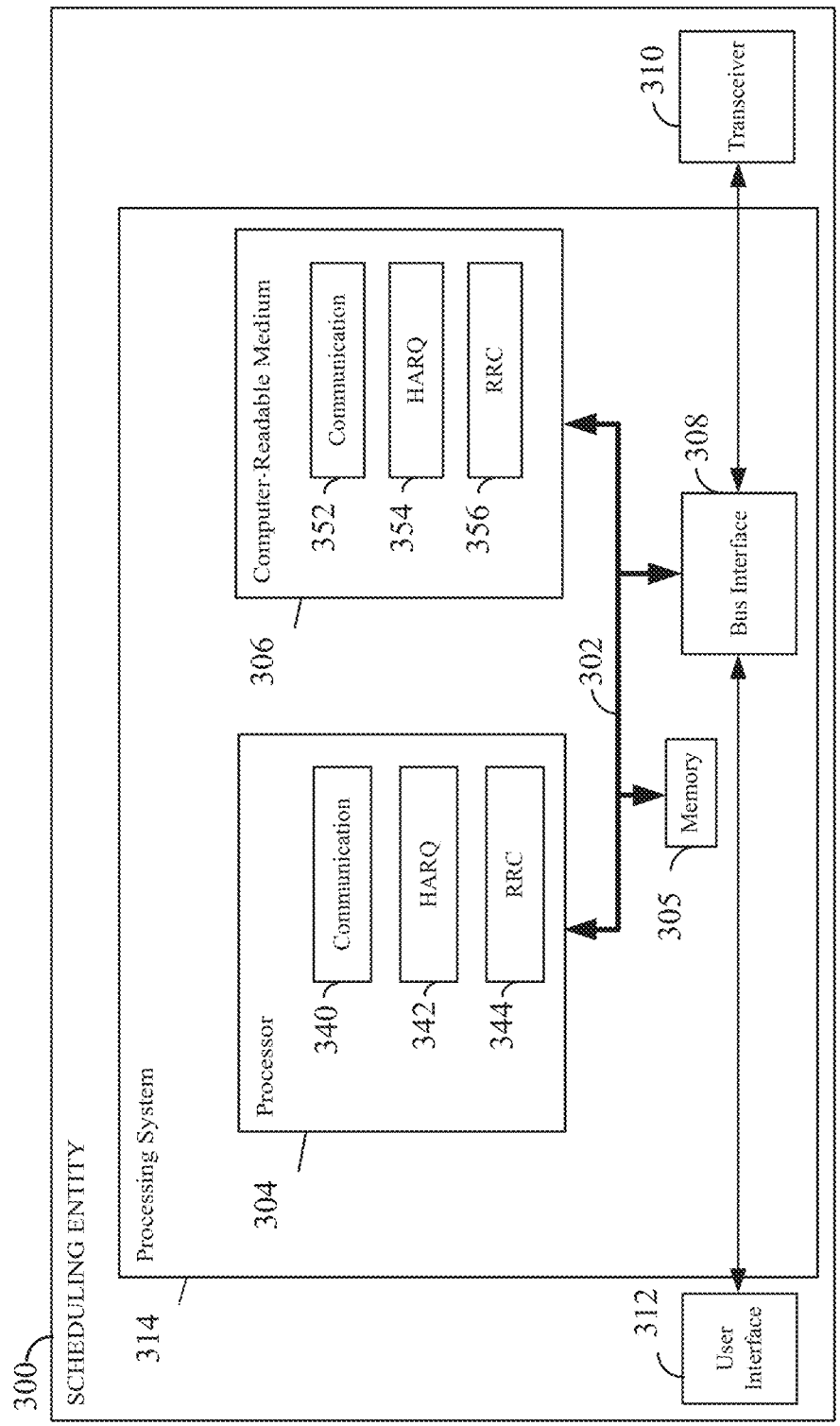
FIG. 3 is a block diagram illustrating an example of a hardware implementation for a scheduling entity employing a processing system according to some aspects of the disclosure.

FIG. 3 is a block diagram illustrating an example of a hardware implementation for a scheduling entity 300 employing a processing system 314. For example, the scheduling entity 300 may be a user equipment (UE) as illustrated in any one or more of FIGS. 1 and/or 2. In another example, the scheduling entity 300 may be a base station as illustrated in any one or more of FIGS. 1 and/or 2.

The scheduling entity 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 300 may be configured to perform any one or more of the functions described herein. That is, the processor 304, as utilized in a scheduling entity 300, may be used to implement any one or more of the processes and procedures described below and illustrated in FIGS. 5-13.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a communication interface or means for communicating with various other apparatus over a transmission medium. Depending upon the nature of the apparatus, a user interface 312 (e.g., keypad, display, speaker, microphone, joystick) may also be provided.

In some aspects of the disclosure, the processor 304 may include circuitry configured to implement one or more of the functions and processes described below in relation to FIGS. 5-13. For example, the processor 304 may include a communication block 340, a HARQ block 342, and an RRC block 344. The communication block 340 may be configured to perform various wireless communication functions (e.g., transmitting and receiving control information and user data) utilizing the transceiver 310 or communication interface. The HARQ block 342 may be configured to perform various HARQ related processes and procedures described for example in relation to FIGS. 5-13. The RRC block 344 may be configured to perform various RRC procedures for configuring and controlling wireless communication between the scheduling entity 300 and other UEs or devices described, for example, in relation to FIGS. 5-13.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 306 may include software or code configured to implement one or more of the functions or processes described in relation to FIGS. 5-13. For example, the computer-readable storage medium 306 may include communication code 352, HARQ code 354, and RRC code 356. The processor 304 may execute the communication code 352 to perform various wireless communication functions (e.g., transmitting and receiving control information and user data) utilizing, for example, the communication block 340 and transceiver 310. The processor 304 may execute the HARQ code 354 to perform various HARQ processes and procedures described for example in relation to FIGS. 5-13. The processor 304 may execute the RRC code 356 to perform various RRC processes and procedures for configuring and controlling wireless communication between the scheduling entity 300 and other UEs described, for example, in relation to FIGS. 5-13.

Figure 4:
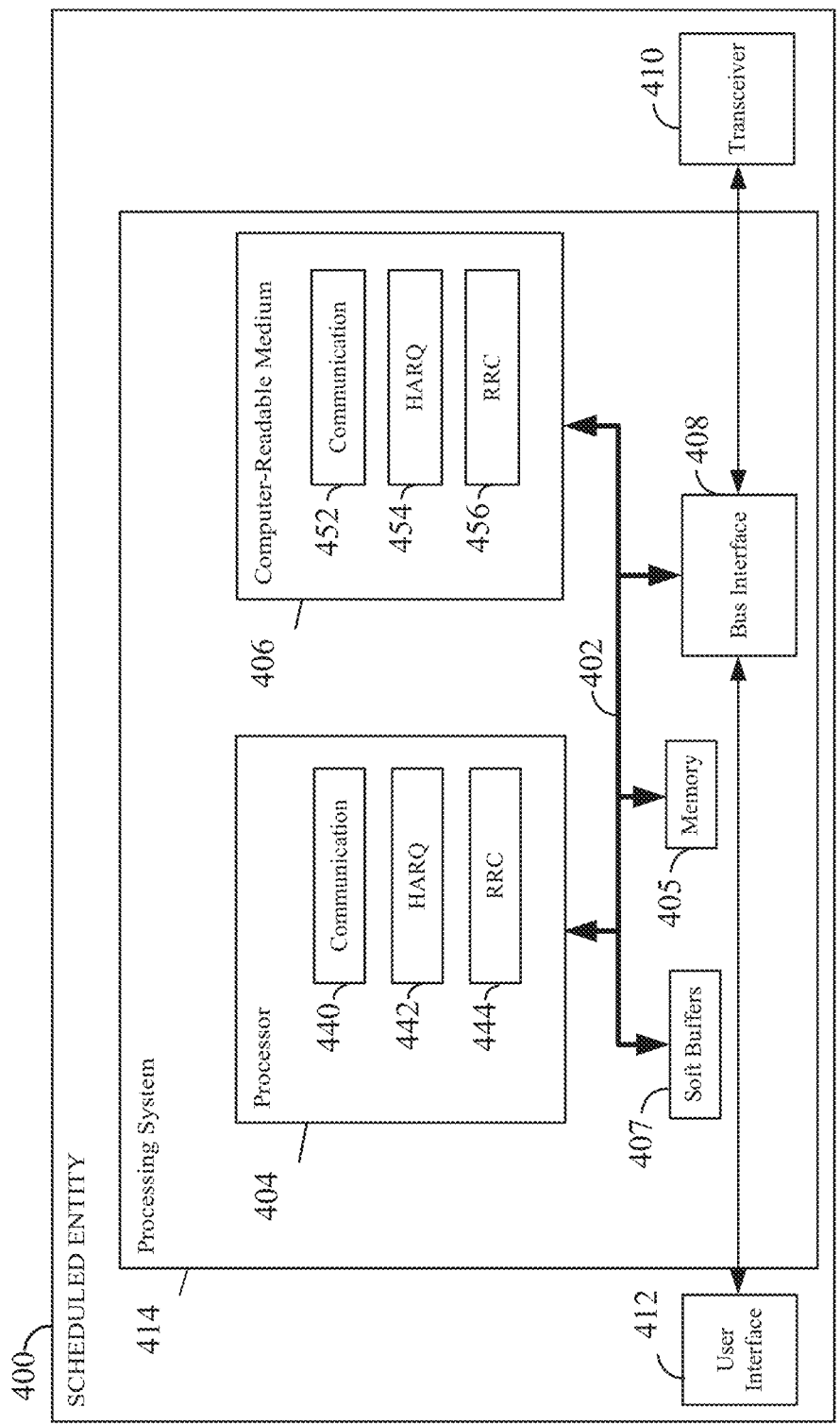
FIG. 4 is a block diagram illustrating an example of a hardware implementation for a scheduled entity employing a processing system according to some aspects of the disclosure.

FIG. 4 is a conceptual diagram illustrating an example of a hardware implementation for an exemplary scheduled entity 400 employing a processing system 414. In accordance with various aspects of the disclosure, an element, or any portion of an element, or any combination of elements may be implemented with a processing system 414 that includes one or more processors 404. For example, the scheduled entity 400 may be a user equipment (UE) as illustrated in any one or more of FIGS. 1 and/or 2.

The processing system 414 may be substantially the same as the processing system 314 illustrated in FIG. 3, including a bus interface 408, a bus 402, memory 405, a processor 404, and a computer-readable medium 406. Furthermore, the scheduled entity 400 may include a user interface 412 and a transceiver 410 (or communication interface) substantially similar to those described above in FIG. 3. That is, the processor 404, as utilized in a scheduled entity 400, may be used to implement any one or more of the processes described below and illustrated in FIGS. 5-13.

In some aspects of the disclosure, the processor 404 may include circuitry configured to implement one or more of the functions described below in relation to FIGS. 5-13. For example, the processor 404 may include a communication block 440, a HARQ block 442, and an RRC block 444. The communication block 440 may be configured to perform various wireless communication functions (e.g., transmitting and receiving control information and user data) utilizing the transceiver 410 or communication interface. The HARQ block 442 may be configured to perform various HARQ processes and procedures described for example in relation to FIGS. 5-13. The RRC block 444 may be configured to perform various RRC procedures or processes for controlling wireless communication between the scheduled entity 400 and a scheduling entity described, for example, in relation to FIGS. 5-13.

The computer-readable storage medium 406 may include communication code 452, HARQ code 454, and RRC code 456. The processor 404 may execute the communication code 452 to perform various wireless communication functions (e.g., transmitting and receiving control information and user data) utilizing the communication block 440 and transceiver 410. The processor 404 may execute the HARQ code 454 to perform various HARQ processes and procedures described for example in relation to FIGS. 5-13. The processor 404 may execute the RRC code 456 to perform various RRC procedures for configuring and controlling wireless communication between the scheduled entity 400 and a scheduling entity described, for example, in relation to FIGS. 5-13.

Figure 5:
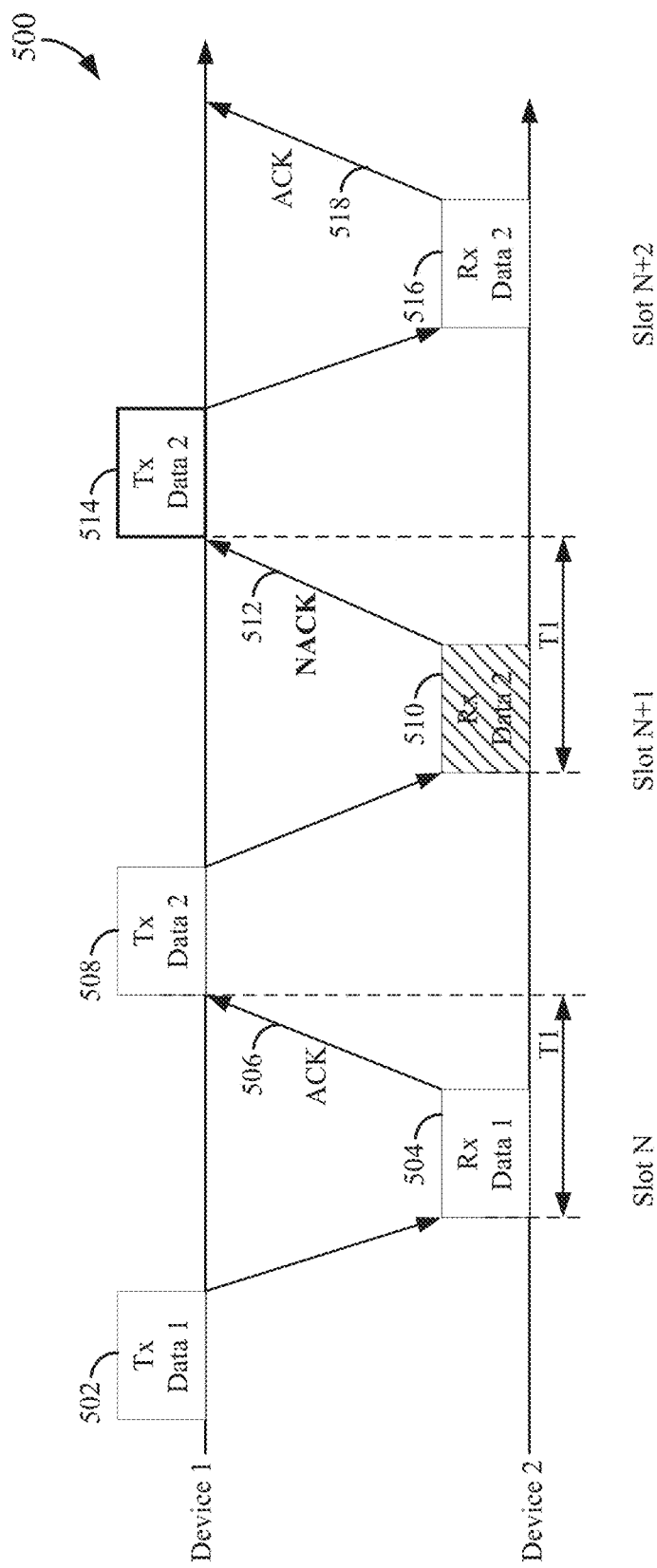
FIG. 5 is a diagram illustrating a hybrid automatic repeat request (HARQ) process according to some aspects of the disclosure.

FIG. 5 is a diagram illustrating an exemplary HARQ process 500 according to some aspects of the disclosure. The HARQ process 500 may be performed by any of the scheduling entities and/or scheduled entities illustrated in FIGS. 1-4. A transmitting device (e.g., device 1) may transmit a first data packet 502 to a receiving device (e.g., device 2). In some examples, the transmitting device may be a base station or scheduling entity, and the receiving device may be a UE or scheduled entity. In some examples, the first data packet 502 may be a DL PDSCH packet. If the first data packet 504 is correctly received and/or decoded, the receiving device may transmit an ACK 506 to notify the transmitting device. The time delay (T1) between the reception of the data and the transmission of an ACK or NACK may be within the same slot (e.g., slot N) or next one or more slots (e.g., slot N+1 or slot N+2).

After receiving the ACK 506, the transmitting device may transmit a second data packet 508 to the receiving device. If the second data packet 510 is not successfully received and/or decoded, the receiving device may transmit a NACK 512 to notify the transmitting device. In response to the NACK, the transmitting device may retransmit the data packet 514, using chase combining, incremental redundancy, etc. If the retransmitted data packet 516 is correctly received and decoded, the receiving device may transmit an ACK 518 to notify the transmitting device.

In some aspects of the disclosure, HARQ timing management may consider a UE capability category that is UE dependent. A UE (or scheduled entity) may be categorized into one or more capability categories based on its ability to generate HARQ responses (e.g., ACK or NACK) within a predetermined delay or slot. For example, three different UE capability categories are illustrated in table 600 of FIG. 6. In a UE1 category, a UE is capable of providing a HARQ response in the same slot in which the corresponding data transmission is received. In a UE2 category, a UE is capable of transmitting a HARQ response in the next one or two slots after receiving the data transmission. In a UE3 category, a UE is capable of transmitting a HARQ response in the next two or three slots after receiving the data transmission. In other examples, additional capability categories may be used to categorize the UEs.

In some aspects of the disclosure, a UE may provide a HARQ response different (i.e., advancing or delaying HARQ timing) than the specified or default HARQ response timing of the UE's category with some limitations and constraints. A constraint is a condition in which one or more operation parameters of the UE do not satisfy or meet a predetermined level or setting. For example, a UE of UE2 category may be configured to provide a HARQ response in the same slot, earlier than its nominal or default timing, with certain limitations or constraints. Similarly, a UE of UE3 category may be configured to provide a HARQ response in the next slot, earlier than its nominal or default timing, with some limitations or constraints.

In one example, a UE of UE2 category may transmit a next-slot HARQ response in a default setting, but may be able to provide an earlier same-slot HARQ response by advancing its HARQ timing, for example, when the UE handles lower rank transmission (e.g., rank 1), limited transport block size (TBS), less complex modulation and coding scheme (MCS), etc., a constraint condition in which the UE has extra resources that may be allocated to transmit a HARQ response earlier. In general, when a UE has extra available resources (e.g., time, processing power, storage, bandwidth, frequency etc.), it may be configured to advance its HARQ timing to provide a HARQ response earlier than its default or nominal delay or timing. In some aspects of the disclosure, UEs may be grouped into different capability categories based on their HARQ capabilities that may be different from or in addition to those shown in FIG. 6.

Figure 7:
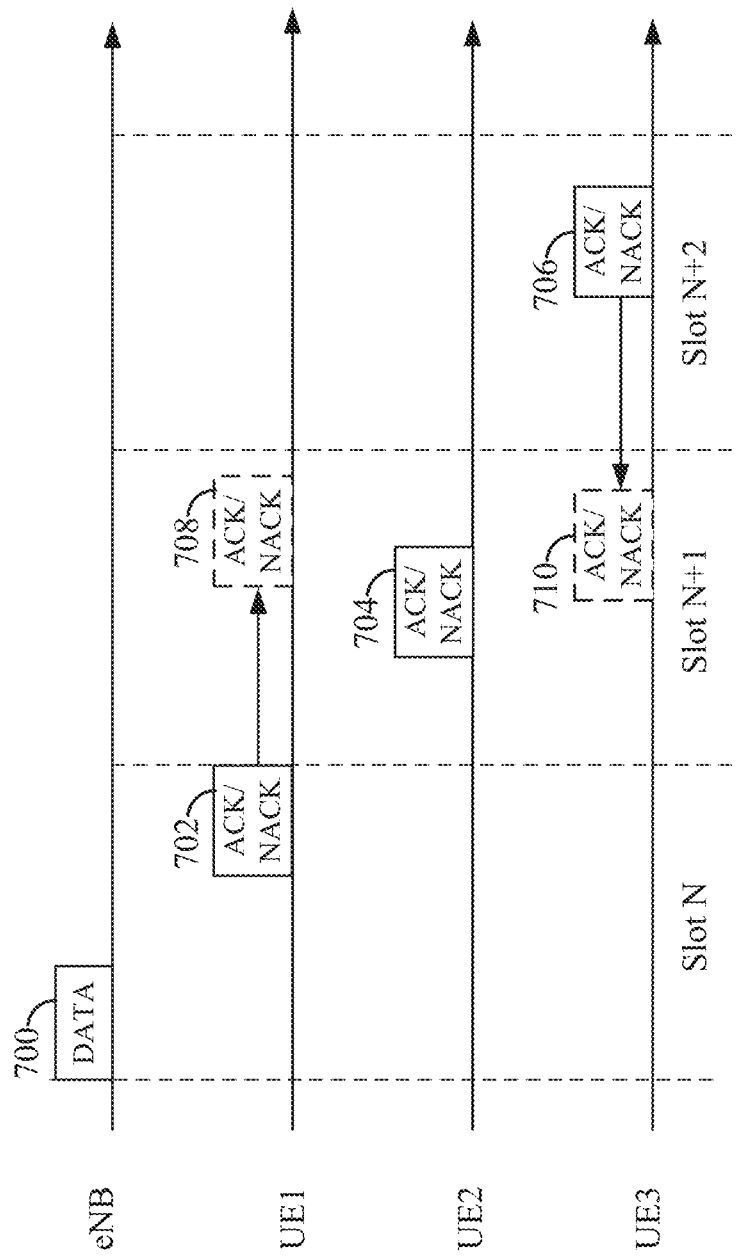
FIG. 7 is a diagram illustrating some exemplary HARQ responses based on UE capability categories according to some aspects of the disclosure.

FIG. 7 is a diagram illustrating some exemplary HARQ responses based on UE capability categories according to some aspects of the disclosure. A scheduling entity (e.g., eNB or gNB) transmits data 700 to different scheduled entities (e.g., UE1, UE2, UE3) in a slot N. The data 700 may be transmitted in a DL channel including a PDCCH and a PDSCH. The data 700 may include first DL data destined for a first UE (UE1), second DL data destined for a second UE (UE2), and third DL data destined for a third UE (UE3). In response to receiving the data 700, UE1 may send a HARQ response 702 (e.g., ACK or NACK) within the same slot N. In response to the data 700, UE2 may be send a HARQ response 704 in the next slot (slot N+1) or in a slot after slot N+1 (e.g., slot N+2). In response to the data 700, UE3 may send a HARQ response 706 in the next-next slot (i.e., slot N+2) or in a slot after slot N+2. The particular positions of the data 700 and HARQ responses shown in FIG. 7 are illustrative in nature and not restrictive. The data 700 may also include DL control data. For example, the DL control data may include PDCCH data (e.g., DCI) for providing one or more parameters or information of the DL transmission. The parameters may include information for configuring the HARQ response timing of the UEs.

In some aspects of the disclosure, a HARQ response may be dynamically advance or delayed relative to its default or nominal HARQ response timing. It means that a device may dynamically configure its HARQ response time to be different per slot. In one example, a UE of UE1 category may be dynamically configured to send a delayed HARQ response 708 in the next available UL transmission opportunity (e.g., slot N+1) as compared to its default HARQ timing (e.g., slot N). The delay may be within the same slot or extended to a later slot. In another example, a UE may be configured to advance its HARQ response 710 in the same slot or to an earlier slot.

In some examples, the use of a delayed or advanced HARQ response may be indicated by a certain value (e.g., one or more bits in downlink control information or uplink control information) that is exchanged between the base station and UE for dynamic HARQ timing management. For example, a value of 0 may indicate a same-slot HARQ response, a value of 1 may indicate a delayed HARQ response (e.g., N+1 slot or N+2 slot), and a value of 2 may indicate an advanced HARQ response. The DL control data (e.g., PDCCH) may include parameters for indicating the amount of delay and/or advance in HARQ response timing. In one example, when the HARQ response is delayed and if the next slot is an all-DL slot, the UE may omit the HARQ response in the next slot. It is because an all-DL slot provides no UL transmission. In another example, if the next slot is an all-DL slot, the UE may postpone the HARQ response until it finds a slot with an UL transmission opportunity, which may be an implicit way of dynamic ACK/NACK timing signaling. The above-described dynamic HARQ response processes may be applied to HARQ retransmission of UL data from a UE.

Figure 8:
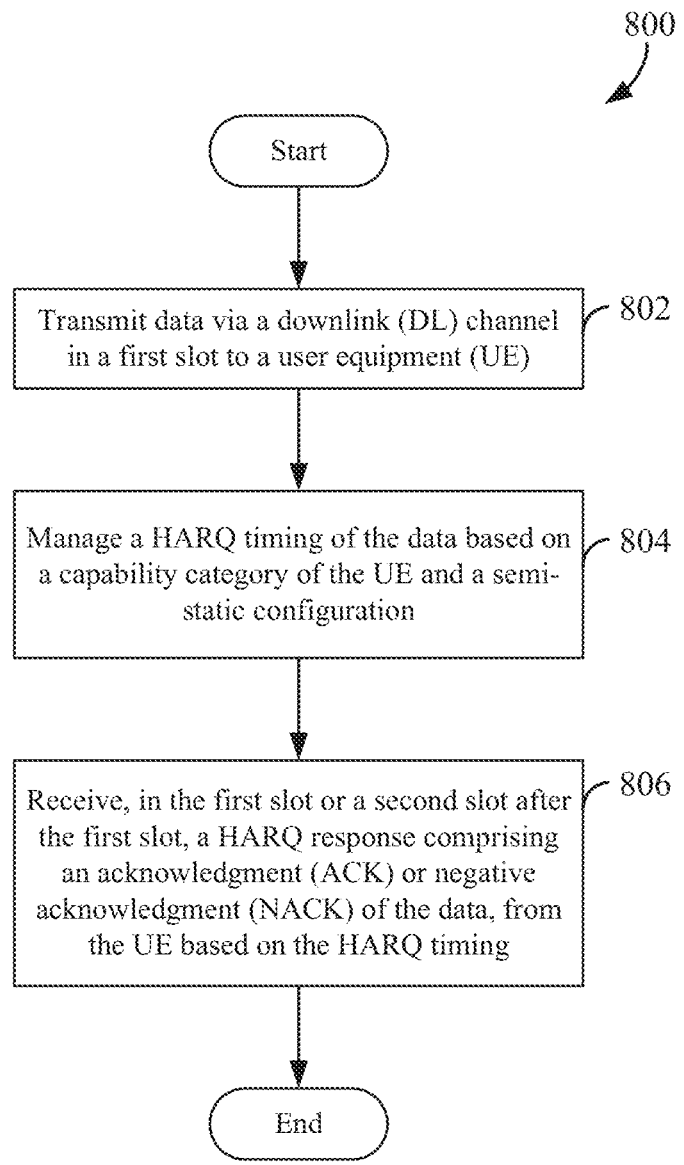
FIG. 8 is a flow chart illustrating an exemplary HARQ process for wireless communication according to some aspects of the present disclosure.

FIG. 8 is a flow chart illustrating an exemplary HARQ process 800 for wireless communication in accordance with some aspects of the present disclosure. As described below, some or all illustrated features may be omitted in a particular implementation within the scope of the present disclosure, and some illustrated features may not be required for implementation of all embodiments. In some examples, the HARQ process 800 may be carried out by the scheduling entity 300 illustrated in FIG. 3. In some examples, the process 800 may be carried out by any suitable apparatus or means for carrying out the functions or algorithm described below.

At block 802, the scheduling entity 300 (e.g., eNB or base station) may transmit data via a DL channel in a first slot to a UE (e.g., scheduled entity 400). For example, the data may be the same as the data 700 illustrated in FIG. 7 destined to one or more UEs. The scheduling entity 300 may utilize a communication block 340 and a communication interface (e.g., transceiver 310) to transmit and/or receive data. The data may include control (e.g., PDCCH) and payload data (e.g., PDSCH). At block 804, the scheduling entity may utilize a HARQ block 342 to manage the HARQ timing of the data based on a capability category of the UE and a semi-static configuration of the UE. For example, the UE may belong to a UE category (e.g., UE1, UE2, or UE3 of FIG. 6) that is capable of providing a HARQ response in the same slot after a certain delay (e.g., UE1 category), a next slot (e.g., UE2 category), or a predetermined number of slots (e.g., UE3 category) after receiving the data. In one example, the semi-static configuration may be a radio resource control (RRC) configuration that defines the UE's capability category and default HARQ timing.

Figure 9:
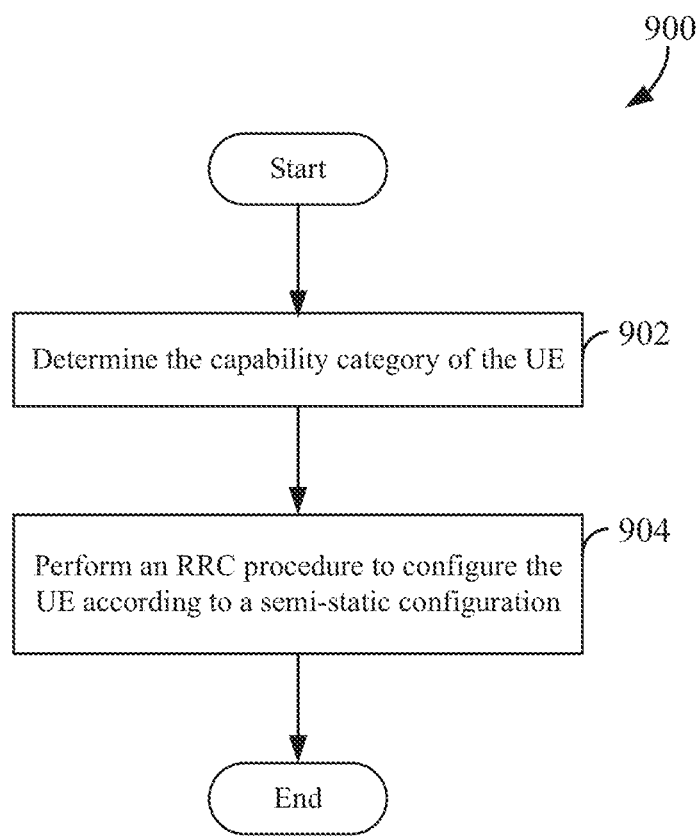
FIG. 9 is a flow chart illustrating an exemplary process for managing HARQ response timing according to some aspects of the present disclosure.

FIG. 9 is a flow chart illustrating an exemplary process 900 for managing HARQ response timing in accordance with some aspects of the present disclosure. At block 902, the scheduling entity determines the capability category of the UE. For example, the scheduling entity may receive information on the capability of the UE during connection establishment or RRC signaling. Based on the capability of the UE to provide a HARQ response within a certain slot or delay, the scheduling entity may determine the capability category of the UE. Factors for determining the capability of the UE may include at least one of transmission rank, transport block size (TBS) limit, modulation and coding scheme (MCS), etc.

At block 904, the scheduling entity 300 may utilize an RRC block 344 to perform an RRC procedure to configure the UE according to a semi-static configuration based on its capability to provide a HARQ response. Examples of the semi-static configuration may be an RRC configuration that configures various resources allocated for HARQ processes and responses. In one example, the semi-static configuration may define a default or nominal HARQ response timing of the UE and allocated power and resources for HARQ processes based on its capability category.

In some aspects of the disclosure, the UE's HARQ response timing may be changed or managed dynamically, for example, using DL control information (DCI) carried in a slot. For example, the DCI of the PDCCH may include one or more bits that indicate the requested HARQ response timing for DL data for the current slot. The requested HARQ response timing may be the same slot or next one or more slots similar to those illustrated in FIG. 6. In one example, assuming the UE received DL data in a first slot, the scheduling entity may request the HARQ response to be in the first slot (i.e., same slot) or one or more slots after the first slot. Managing the HARQ timing processes may also include soft buffer management, UL control channel resource determination, and resource size management, which will be described in more detail below.

In some aspects of the disclosure, the scheduling entity may delay or advance a HARQ timing for receiving the HARQ response by a predetermined time interval or slot. In some examples, the scheduling entity may indicate the delay in the DCI or DL control message to delay the HARQ response within the same slot or to next one or more slots. In some examples, the scheduling entity may advance a HARQ timing for receiving the HARQ response by a predetermined time interval. For example, the scheduling entity may indicate the amount of advance in the DCI or DL control message.

Referring back to FIG. 8, at block 806, the scheduling entity may utilize the HARQ block 342 to receive, in the first slot or a second slot after the first slot, a HARQ response from the UE based on the HARQ timing. For example, the HARQ response may be an ACK or NACK similar to those illustrated in FIG. 5. The scheduled entity may receive the HARQ response within the same first slot (e.g., slot N) or a later slot (e.g., slot N+1 or slot N+2). The HARQ response timing may be the default timing or a dynamically indicated timing carried in the DL control channel.

In some aspects of the disclosure, UL HARQ timing management processes similar to the above described DL HARQ processes may be performed for UL data without departing from the scope of the present disclosure.

In some aspects of the disclosure, dynamic HARQ management involves soft buffer management. A UE may maintain one or more soft buffers for receiving data from the scheduling entity (e.g., eNB) or other wireless devices. For example, the soft buffers may be the same as the soft buffers 407 (see FIG. 4) or implemented in the memory 405 (see FIG. 4) of a UE. HARQ may use an error correction technique called soft combining. Using soft combining, data packets that are not successively decoded are not discarded but saved in soft buffers and combined with the next retransmission. The number of soft buffers available may be determined by the UE's category, capability, and number of on-going HARQ processes. In general, the more HARQ processes a UE can handle, the more soft buffers it may maintain. In particular, under dynamic HARQ timing management, delay HARQ responses may be facilitated using more soft buffers.

In some examples, a UE may support various services such as Enhanced Mobile Broadband (eMBB), Low Latency Communications (URLLC), and Massive Machine Type Communications (mMTC), etc. However, these services may have different requirements in terms of latency, reliability, bandwidth, etc. Therefore, the UE may be configured to perform separate or partitioned soft buffer management for different services or applications based on various requirements.

Figure 10:
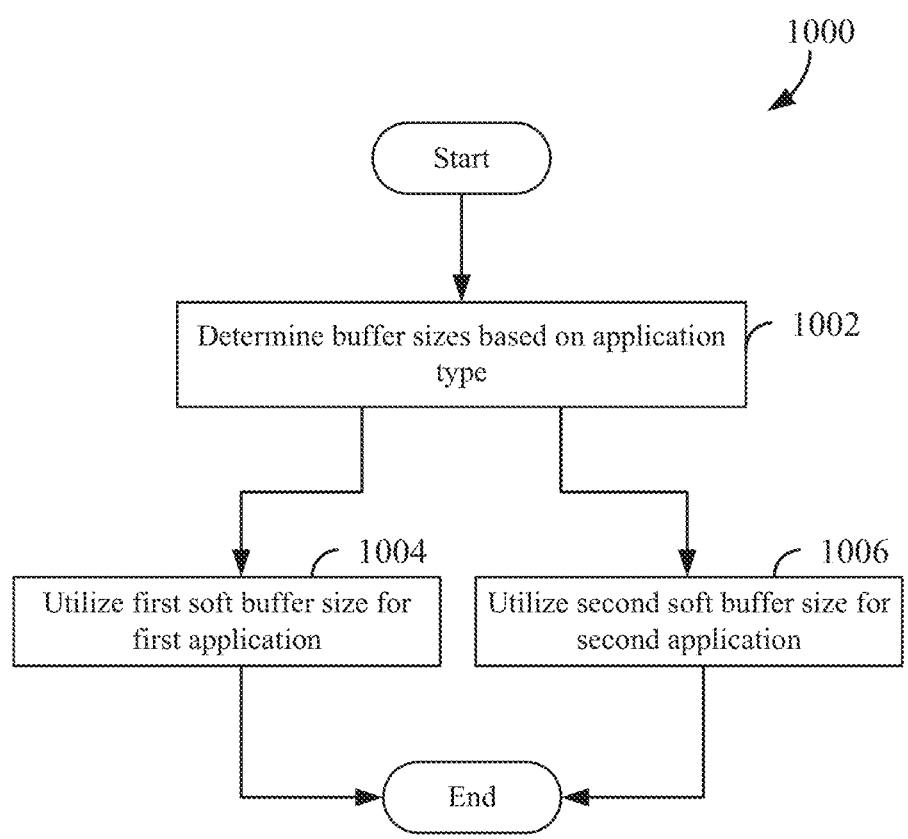
FIG. 10 is a diagram illustrating a HARQ soft buffer management process according to some aspects of the disclosure.

FIG. 10 is a diagram illustrating a soft buffer management process 1000 in accordance with some aspects of the disclosure. In one example, a UE may manage one or more separate soft buffers (e.g., soft buffers 407 of FIG. 4) for different applications (e.g., eMBB and URLLC). At block 1002, the UE may utilize its HARQ block 442 to determine various soft buffer sizes based on application or service types. At block 1004, the UE may utilize a first soft buffer size for a first application. At block 1006, the UE may utilize a second soft buffer size different from the first soft buffer size for a second application. For example, the first application may be a URLLC application, and the second application may be an eMBB application. Due to URLLC's much lower data rate, the total soft buffer size may be smaller than that of eMBB, which may have a high data rate. However, URLLC may have more stringent over-the-air (OTA) block error rate (BLER) requirement than eMBB, to ensure good HARQ combining. In some examples, the number of partitioned soft buffers for URLLC can be larger (compared with eMBB) to handle more pending packets. For example, an eMBB application may utilize two partitioned soft buffers, while a URLLC application may utilize four partitioned soft buffers.

Figure 11:
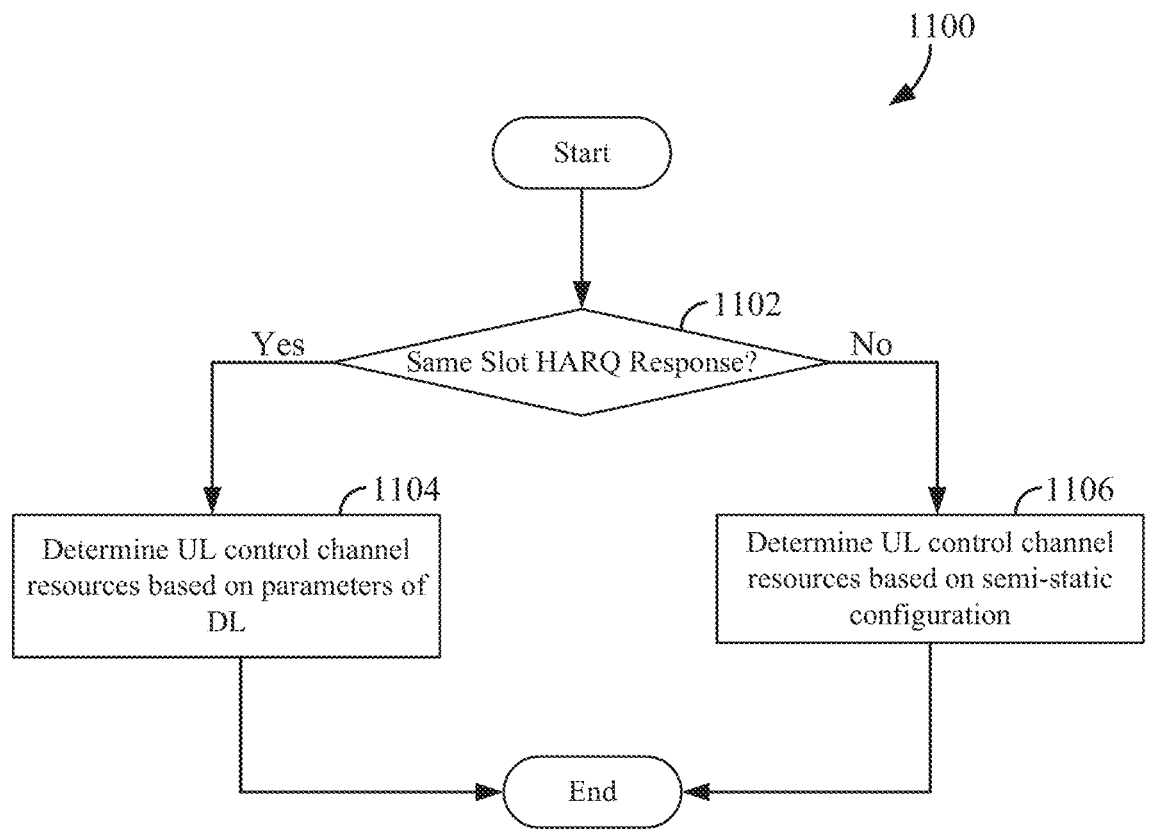
FIG. 11 is a diagram illustrating an uplink channel resource management process for a HARQ process according to some aspects of the disclosure.

FIG. 11 is a diagram illustrating an uplink channel resource management process 1100 for a HARQ process in accordance with some aspects of the disclosure. When using dynamic HARQ response timing, a HARQ response may be in the same slot of the received data or next slots (e.g., two or more slots later), the uplink resources for an UL control channel transmission (e.g., PUCCH) carrying a HARQ response in a first slot can be separately managed from a HARQ response in a second slot. At decision block 1102, if a UE is capable of providing a same-slot HARQ response, the process proceeds to block 1104; otherwise, the process proceeds to block 1106. At block 1104, the UE may determine the UL control resources (e.g., PDCCH resources) based on one or more parameters of the DL transmission. Some examples of these parameters are control channel element (CCE) of a DL control channel (e.g., PDCCH), physical resource block (PRB) index of PDSCH, and the like. At block 1106, the UE may determine the UL control resources based on a semi-static configuration (e.g., an RRC configuration). In one example, an RRC configuration may configure 4 possible resources (e.g., data size, power, antennas), and a DL control message (e.g., DCI of a PDCCH) can indicate which one to use.

Figure 12:
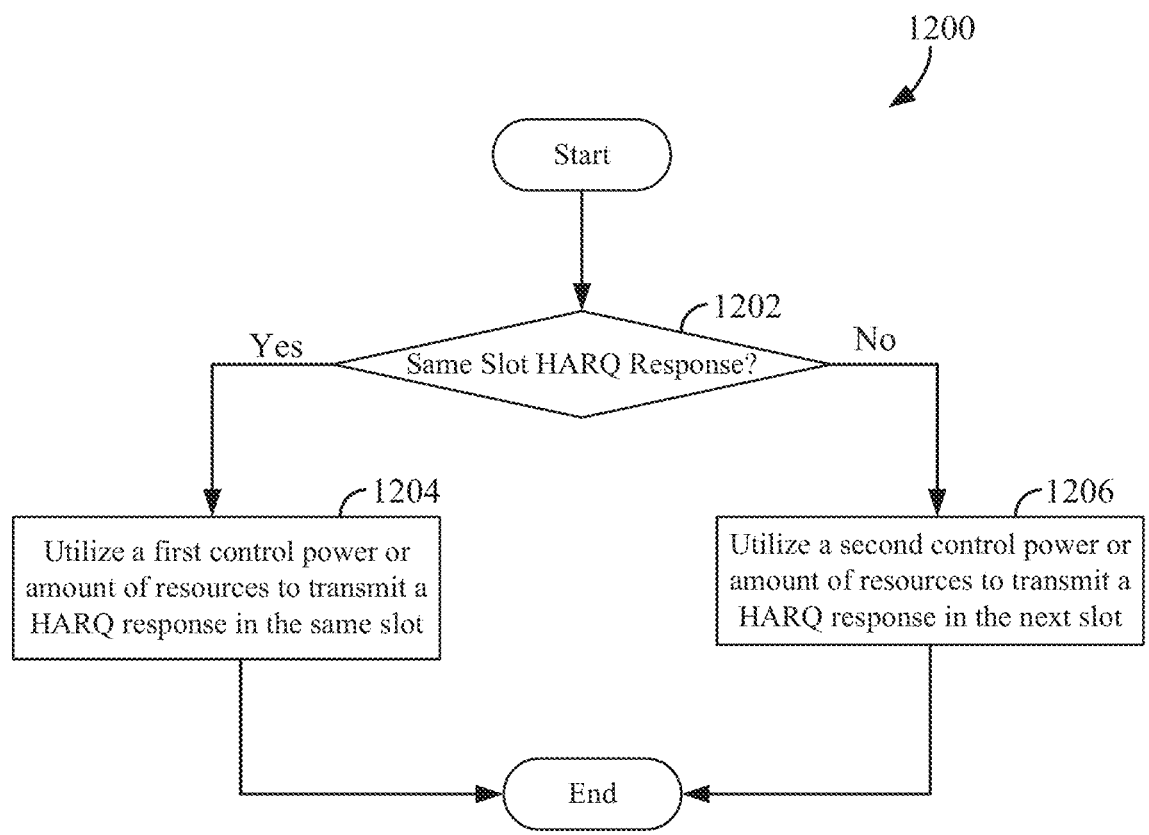
FIG. 12 is a diagram illustrating another uplink channel resource management process for a HARQ process according to some aspects of the disclosure.

FIG. 12 is a diagram illustrating another uplink channel resource management process 1200 for a HARQ process in accordance with some aspects of the disclosure. In some aspects of the disclosure, if a HARQ response is to be piggybacked on a UL channel (e.g., PUSCH or PUCCH), the amount of resources used for the HARQ response may be different depending on the indicated HARQ timing (e.g., same slot, next one or more slots). A UE capable of same-slot HARQ response can use different resources for sending the HARQ response in different indicated slots. At decision block 1202, if a UE is indicated to provide a same-slot HARQ response, the process proceeds to block 1204; otherwise, the process proceeds to block 1206. At block 1204, the UE may use a first control power or first amount of resources to send a HARQ response in the same slot on the PUCCH or PUSCH. At block 1206, the UE may use a second control power or second amount of resources to send a HARQ response in the next one or more indicated slots. The second control power may be greater than the first control power, and the second amount of resources may provide greater UL resources than the first amount of resources. In general, allocating more power and/or resources can improve the reliability of the UL transmission.

In some examples when the HARQ response is delayed in the same slot or next slot(s), especially for URLLC, more conservative power control (i.e., higher power) may be applied. If the HARQ response is transmitted in the next slot(s) on the PUSCH, the UE may use more resources than that when the HARQ response is transmitted in the same slot. In general, allocation more resources and/or power may achieve the desired performance target. The processes described in relation to FIGS. 11 and 12 may be utilized together, separately, or in various combinations.

Figure 13:
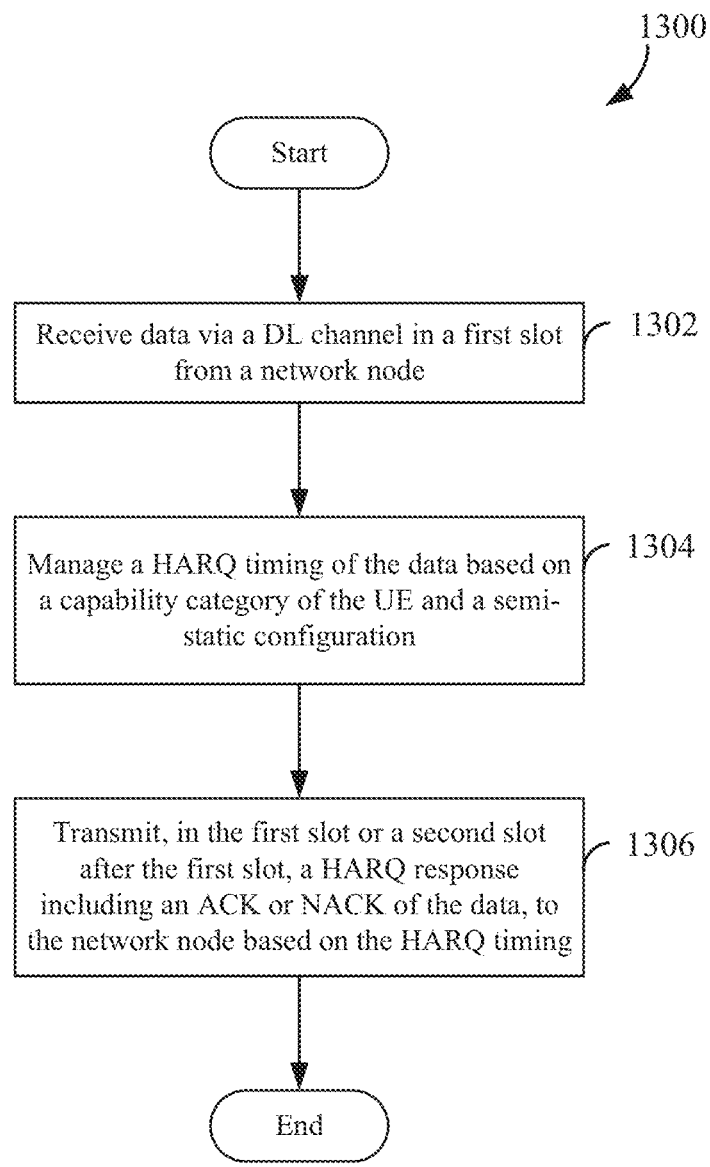
FIG. 13 is a flow chart illustrating another exemplary HARQ process for wireless communication according to some aspects of the present disclosure.

FIG. 13 is a flow chart illustrating an exemplary HARQ process 1300 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduled entity 400 illustrated in FIG. 4. In some examples, the process 1300 may be carried out by any suitable apparatus (e.g., UE) or means for carrying out the functions or algorithm described below.

At block 1302, a UE may utilize a communication block 440 and a communication interface 410 (see FIG. 4) to receive data via a DL channel (e.g., PDSCH) in a first slot from a network node (e.g., gNB, eNB or scheduling entity 300). For example, the data may be the same as the DL data 700 illustrated in FIG. 7. At block 1304, the UE may utilize a HARQ block 442 to manage a HARQ timing of the data based on a capability category of the UE and a semi-static configuration (e.g., RRC configuration). The HARQ timing may be similar to the HARQ response timing illustrated in FIGS. 6 and 7 in which the HARQ response may be in the same slot or next slot(s). The UE may utilize an RRC block 444 to perform an RRC procedure to configure the UE according to a semi-static configuration. Examples of the semi-static configuration may be an RRC configuration that configures various UL resources. The semi-static configuration may be an RRC configuration that defines the capability category of the UE and the corresponding default HARQ response timing.

In one example, the semi-static configuration may define a default HARQ response timing of the UE and allocated power and resources for HARQ processes based on its capability category. In some examples, the UE may be dynamically configured to provide a HARQ response in the same slot after a certain delay, a next slot, or a predetermined number of slots after receiving the data. In some examples, the scheduling entity may dynamically indicate the HARQ response timing of a slot, for example, in the DCI of the DL control channel Therefore, the UE may change its HARQ response timing to the dynamically indicated timing that may be different from the default timing defined in the semi-static configuration.

At block 1306, the UE may transmit, in the first slot or a second slot after the first slot, a HARQ response (e.g., ACK or NACK) to the network node based on the configured HARQ timing. In some examples, the HARQ timing may be changed or managed semi-statically or dynamically, for example, in different TTIs or slots. Managing the HARQ timing may include soft buffer management, UL control channel power resource determination, and resource size management as described above in relation to FIGS. 10-12.

In one configuration, the apparatus 300 and/or 400 for wireless communication includes means configured to perform the functions recited above. Of course, in the above examples, the circuitry and blocks included in the processor 304 and 404 are merely provided as an example, and other means for carrying out the described functions may be included within various aspects of the present disclosure, including but not limited to the instructions stored in the computer-readable storage medium 306, 406, or any other suitable apparatus or means described in any one of the FIGS. 1-4, and utilizing, for example, the processes and/or algorithms described herein in relation to FIGS. 8-13.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of performing a hybrid automatic repeat request (HARQ) process at a scheduling entity, the method comprising:
   transmitting data via a downlink (DL) channel in a first slot to a user equipment (UE);
   managing a HARQ timing of the data based on a capability category of the UE and a semi-static configuration, wherein the managing comprises setting the HARQ timing to a non-default HARQ timing based, at least in part, on a constraint condition comprising a transmission rank, a transport block size (TBS) of the data, a modulation and coding scheme (MCS), or a combination thereof; and
   receiving, in the first slot or a second slot after the first slot provided the second slot is not an all DL-slot, a HARQ response comprising an acknowledgment (ACK) or negative acknowledgment (NACK) of the data, from the UE based on the HARQ timing.

2. The method of claim 1, wherein the managing comprises:
   determining the HARQ timing for receiving the HARQ response to be in the first slot or the second slot based on the capability category of the UE.

3. The method of claim 2, further comprising:
   advancing the HARQ timing when the UE is operating under the constraint condition.

4. The method of claim 1, wherein the managing comprises:
   dynamically or semi-statically delaying the HARQ timing for receiving the HARQ response by a predetermined time interval.

5. The method of claim 1, wherein the managing comprises:
   transmitting one or more parameters in the DL channel for determining uplink resources for the HARQ response when the HARQ response is transmitted in the first slot; and
   transmitting an indicator in the DL channel to indicate an uplink resource predefined in a semi-static configuration for the HARQ response when the HARQ response is transmitted in the second slot.

6. A method of performing a hybrid automatic repeat request (HARQ) process at a user equipment (UE), the method comprising:
   receiving data via a downlink (DL) channel in a first slot from a network node;
   managing a HARQ timing of the data based on a capability category of the UE and a semi-static configuration, wherein the managing comprises setting the HARQ timing to a non-default HARQ timing based, at least in part, on a constraint condition comprising a transmission rank, a transport block size (TBS) of the data, a modulation and coding scheme (MCS), or a combination thereof; and
   transmitting, in the first slot or a second slot after the first slot provided the second slot in not an all DL-slot, a HARQ response comprising an acknowledgment (ACK) or negative acknowledgment (NACK) of the data, to the network node based on the HARQ timing.

7. The method of claim 6, wherein the managing comprises:
   determining uplink resources for transmitting the HARQ response based on one or more parameters of the DL channel received in the first slot when the HARQ response is transmitted in the first slot; and
   determining uplink resources for transmitting the HARQ response predefined in the semi-static configuration when the HARQ response is transmitted in the second slot.

8. The method of claim 6, wherein the managing comprises:
   determining a first allocation of resources to an uplink channel for transmitting the HARQ response in the first slot; and
   determining a second allocation of resources, different from the first allocation, to the uplink channel for transmitting the HARQ response in the second slot.

9. The method of claim 6, wherein the received data comprises first application data and second application data, and
   wherein the managing comprises maintaining different number of soft buffers for the first application data and the second application data, respectively.

10. The method of claim 6, further comprising:
    dynamically or semi-statically delaying the HARQ timing for transmitting the HARQ response by a predetermined time interval.

11. The method of claim 6, wherein the second slot comprises an UL portion.

12. The method of claim 6, further comprising:
    advancing the HARQ timing when the UE is operating under the constraint condition.

13. An apparatus, comprising:
    a communication interface configured to communicate with a user equipment (UE) using a hybrid automatic repeat request (HARQ) process;
    a memory; and
    a processor operatively coupled to the communication interface and the memory,
    wherein the processor and the memory are configured to:
      transmit data via a downlink (DL) channel in a first slot to the UE;
      manage a HARQ timing of the data based on a capability category of the UE and a semi-static configuration, comprising setting the HARQ timing to a non-default HARQ timing based, at least in part, on a constraint condition comprising a transmission rank, a transport block size (TBS) of the data, a modulation and coding scheme (MCS), or a combination thereof; and
      receive, in the first slot or a second slot after the first slot provided the second slot is not an all DL-slot, a HARQ response comprising an acknowledgment (ACK) or negative acknowledgment (NACK) of the data, from the UE based on the HARQ timing.

14. The apparatus of claim 13, wherein to manage the HARQ timing, the processor and the memory are further configured to:
determine the HARQ timing for receiving the HARQ response to be in the first slot or the second slot based on the capability category of the UE.

15. The apparatus of claim 14, wherein the processor and the memory are further configured to:
advance the HARQ timing when the UE is operating under the constraint condition.

16. The apparatus of claim 13, wherein to manage the HARQ timing, the processor and the memory are further configured to:
dynamically or semi-statically delay the HARQ timing for receiving the HARQ response by a predetermined time interval.

17. The apparatus of claim 13, wherein to manage the HARQ timing, the processor and the memory are further configured to:
transmit one or more parameters in the DL channel for determining uplink resources for the HARQ response when the HARQ response is transmitted in the first slot; and
transmit an indicator in the DL channel to indicate an uplink resource predefined in a semi-static configuration for the HARQ response when the HARQ response is transmitted in the second slot.

18. A user equipment (UE), comprising:
a communication interface configured to communicate with a network node using a hybrid automatic repeat request (HARQ) process;
a memory; and
a processor operatively coupled to the communication interface and the memory,
wherein the processor and the memory are configured to:
receive data via a downlink (DL) channel in a first slot from the network node;
manage a HARQ timing of the data based on a capability category of the UE and a semi-static configuration, comprising setting the HARQ timing to a non-default HARQ timing based, at least in part, on a constraint condition comprising a transmission rank, a transport block size (TBS) of the data, a modulation and coding scheme (MCS), or a combination thereof; and
transmit, in the first slot or a second slot after the first slot provided the second slot is not an all DL-slot, a HARQ response comprising an acknowledgment (ACK) or negative acknowledgment (NACK) of the data, to the network node based on the HARQ timing.

19. The UE of claim 18, wherein to manage the HARQ timing, the processor and the memory are further configured to:
determine uplink resources for transmitting the HARQ response based on one or more parameters of the DL channel received in the first slot when the HARQ response is transmitted in the first slot; and
determine uplink resources for transmitting the HARQ response predefined in the semi-static configuration when the HARQ response is transmitted in the second slot.

20. The UE of claim 18, wherein to manage the HARQ timing, the processor and the memory are further configured to:
determine a first allocation of resources to an uplink channel for transmitting the HARQ response in the first slot; and
determine a second allocation of resources, different from the first allocation, to the uplink channel for transmitting the HARQ response in the second slot.

21. The UE of claim 18, wherein the received data comprises first application data and second application data, and
wherein to manage the HARQ timing, the processor and the memory are further configured to:
maintain different number of soft buffers for the first application data and the second application data, respectively.

22. The UE of claim 18, wherein the processor and the memory are further configured to:
dynamically or semi-statically delay the HARQ timing for transmitting the HARQ response by a predetermined time interval.

23. The UE of claim 18, wherein the second slot comprises an UL portion.

24. The UE of claim 18, wherein the processor and the memory are further configured to:
advance the HARQ timing when the UE is operating under the constraint condition.

* * * * *